3,705,864
ELECTROPHORETIC DEPOSITION

Gerhard Stieger, Wiesbaden, and Josef Flasch, Mainz-Bischofsheim, Germany, assignors to Reichhold-Albert-Chemie AG, Hamburg, Germany
No Drawing. Filed Oct. 22, 1969, Ser. No. 868,628
Claims priority, application Germany, Oct. 23, 1968,
P 18 04 555.1; Apr. 12, 1969, P 19 18 630.2
Int. Cl. C09d 3/48, 5/24; C23b 13/00
U.S. Cl. 260—22 R       11 Claims

ABSTRACT OF THE DISCLOSURE

A composition suitable as a binder in electrophoretic coating comprising an ammonium or amine salt of a partial esterification product of a telogen containing low-molecular weight polymer of (A) at least one compound containing a polymerizable olefinic bond and being free from hydroxy groups and (B) at least one olefinically unsaturated carboxylic acid or functional derivative thereof with a member selected from the group consisting of
(a)(1) at least one unsaturated long-chain monohydric alcohol,
(a)(2) at least one unsaturated fatty acid derivative selected from hydroxyalkyl esters, alkanolamides and oxazolines,
(a)(3) a combination of (a)(1) and (a)(2) and
(b) with an at least trihydric alcohol,
a process for the preparation of the esterification product and a process for electrophoretically depositing said composition.

---

This invention is concerned with improvements in or relating to the application of surface coatings by electrophoretic deposition. In particular the invention is concerned with a novel composition that is useful as a binder in electrophoretic deposition.

Binders have previously been prepared for use in electrophoretic deposition by forming the ammonium or amine salts of polymers of maleic anhydride and a copolymerizable monomer such as styrene partially esterified with a half ester of a glycol with an unsaturated fatty acid and/or an unsaturated hydroxy fatty acid. It is, however, a disadvantage of such binders that the viscosity of the copolymer may vary with time and that under certain conditions the binder may be chemically unstable.

According to the present invention there is provided a composition suitable for use as a binder in an electrophoretic coating comprising an ammonium or amine salt of a partial esterification product of a telogen-containing low-molecular weight polymer of (A) at least one compound containing a polymerizable olefinic bond and 2 to 12 carbon atoms and being free from hydroxy groups and (B) at least one olefinically unsaturated carboxylic acid or functional derivative thereof containing 2 to 10 carbon atoms with (a)(1) an olefinically unsaturated long-chain monohydric alcohol containing 12 to 24 carbon atoms,
(a)(2) at least one unsaturated fatty acid derivative selected from the group consisting of hydroxyalkyl-esters, alkanolamides, and oxazolines in which the fatty acid radical has 12 to 30 carbon atoms or
(a)(3) a combination of compounds (a)(1) and (a)(2) and
(b) an at least trihydric alcohol having 3 to 10 carbon atoms.

The term "free from hydroxy groups" comprises the absence of carboxylic groups and of alcohol hydroxy groups.

Solutions may be formulated suitable for electrophoretic deposition by using the compositions according to the invention as binders. Such solutions exhibit good throwing power in electrodeposition processes and the coatings deposited show good adhesion and good resistance to corrosion and alkalis. Additionally the copolymers used as starting materials, the binders as well as the actual solution in the electrophoretic deposition bath all possess a viscosity which is substantially constant and capable of being reproduced.

The copolymers generally have an average molecular weight of 400 to 3,000, for example from 500 to 1,500 preferably from 600 to 900 and have an average of from 0.08 to 1.5 carboxylic units per 100 molecular weight units. The term "carboxylic units" means the carboxylic groups or the corresponding number of anhydride groups. Satisfactory results are generally not obtained when the figure of 1.5 carboxyl groups is exceeded. The polymer may be prepared by telomerization of an olefin, preferably a monoolefin having from 2 to 9 C-atoms such as ethylene, propylene, butylene or octene or a substituted olefin or vinyl monomer such as styrene; α-methylstyrene; acrylic or methacrylic acid derivatives e.g. an ester, amide or nitrile thereof; vinylpyridine or vinylpyrrolidone with a monomer containing carboxyl or anhydride groups such as acrylic acid, methacrylic acid, maleic acid, maleic anhydride or maleic acid half esters with monohydric alcohols. Alternatively telomers may be used containing substantially the residues of carboxyl containing or anhydride containing compounds. The telomer is preferably a styrene-maleic anhydride telomer and the molar ratio of maleic anhydride:styrene may be from 1:0.5 to 1:20, preferably from 1:1 to 1:8. Suitable telomers may be prepared from (a) styrene and maleic anhydride in any of the following molar ratios 1:1, 2:1, 3:1, 5:1, 8:1 (b) octene and maleic anhydride in the molar ratio 1:1 (c) styrene and acrylic acid in the molar ratio 1:1 and (d) styrene, α-methyl styrene and maleic anhydride in the molar ratio 1:1:2. The preferred telomers are (a) and (b).

The telogen is incorporated into the telomer and serves as chain transferring agent in the preparation of the telomer. Examples of such telogens include cumene, cymene, xylene, chloroform or diisobutyl ketone. The proportion of telogen, in particular cumene, may be up to about 35% by weight but is preferably 5 to 25% by weight. Because the telomers are of relatively low-molecular weight the viscosity of the esterification product is such that a coating deposited from a solution containing a binder prepared from such an esterification product has good surface flow and the binder has good filling power.

The invention also provides a process for the preparation of a partial esterification product of a low-molecular weight polymer of (I) at least one compound containing a polymerizable olefinic bond and being free from hydroxy groups and (II) at least one olefinically unsaturated carboxylic acid or a functional derivative thereof which comprises reacting said polymer with (III) an alkanolamide of an olefinically unsaturated fatty acid or with an oxazoline of such acid or with both and (IV) simultaneously or subsequently with an at least trihydric alcohol having 3 to 10 carbon atoms.

The esterification may be carried out at 150–280, preferably at 160–270° C.

The alcohols with which the carboxyl groups of the polymer are esterified may be multiple unsaturated alcohols having from 16 to 24 C-atoms.

They can, for example, have iodine numbers of 100–170, preferably 130–160. Suitable alcohols include fatty alcohols obtained e.g. by the reduction of synthetic or naturally occurring oil fatty acids. It is however, possible to use pure alcohols e.g. oleyl alcohol, linoleyl alcohol or linolenyl alcohol. The presence of unsaturated alcohols improves the drying characteristics of the binder. Illustrative of at least trihydric alcohols which may be used in the esterification are tri- or tetrahydric alcohols, such as pentaerythritol, glycerol, trimethylolpropane or trimethylolethane. The viscosity range of the copolymers is generally from 1000 to 3500, preferably from 1500 to 2500 cp. (measured on a 50% solution in toluene at 20° C.) and within the preferred range products having optimum viscosity, good alkali resistance and of value in electrophoretic deposition are produced.

The esterification with the tri- and polyhydric alcohols can be carried out at temperatures of up to 230–270° C., without the resin gelling. The viscosity remains constant and only the acid number drops.

Hydroxyalkyl esters of the unsaturated fatty acids which can be used include, esters of linoleic, cottonseed oil, soya, dehydrated castor, tall, arachidic, ichthyolic or wood oil fatty acids, which may be prepared by reaction of these fatty acids with an alkylene oxide e.g. propylene or ethylene oxide, for example, in the presence of an amine accelerator. Examples of these are linoleic fatty acid hydroxypropyl esters and/or hydroxyethyl esters of the above fatty acids.

Suitable alkanolamines for use in the formation of alkanolamides of the fatty acids are those compounds having from 1–6 carbon atoms, for example di- or tri- or preferably monoalkanolamines, such as mono- or diethanolamine, and amines of the propanols, butanols or hexanols, such as isopropanolamine, N,N-dimethylpropanolamine, 2-amino-2-methylpropanol, 2-amino-2-hydroxymethyl-1,3-propanediol and aminomethyl-propane-diol. These alkanolamines can be reacted e.g. in the presence of catalytic quantities of a sodium alcoholate such as sodium methylate at temperatures of up to 100° C. with the unsaturated, preferably drying, fatty acids, e.g. those mentioned hereinbefore. In place of the free acids, functional derivatives capable of forming esters may be used as esters with lower alcohols and reacted with the alkanolamines to form alkanolamides.

The oxazolines of the fatty acid can be reacted as such but are preferably used in the form of a mixture with fatty acid amides prepared by reaction of fatty acids or their esters e.g. ichthyolic oil, with amines of mono- or polyhydric alcohols. For example, oxazolines of the following Formulae I and II are suitable.

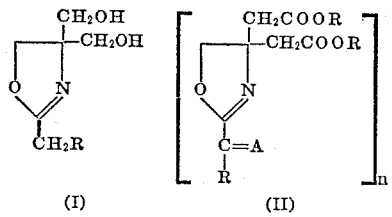

wherein R is a hydrogen atom or an alkyl group having up to 8 carbon atoms and A is two alkyl groups having up to 8 carbon atoms, the group $=CH_2$ or 2 hydrogen atoms and $n$ is an integer from 1 to 30.

As the oxazoline contains a hydroxy or carboxyl group it can be esterified. Alternatively, the heterocyclic ring may react with anhydride groups present in the polymer by cleavage and imide formation. When the amine or ammonium salts are formed—e.g. by reaction with amino alcohols—the water solubility is further improved.

Coatings with particularly good characteristics are obtained when the weight ratio of the polymer to the sum of components (a)(1) and (a)(2) is approximately 70:30 to 30:40 preferably 60:40 to 45:55.

The compositions according to the invention show good resistance to hydrolysis in neutralised aqueous solutions and can be stored satisfactorily at temperatures of up to 80° C. Thus, even at elevated temperatures, solutions of the compositions for electrophoretic deposition can be transported in tanker vehicles. Due to the relatively low viscosity of solutions, even up to about 70%, preferably to about 50% concentrations, the solutions which may have a viscosity of 200–300 cp. at 20° C. can be pumped through pipelines and previously this was a great problem. As a result of the good stability of the aqueous solutions the use of the products is both simple and safe.

Coatings applied by dip varnishing have an excellent surface and their stability in the salt spray test (ASTM B–11761), even without the addition of pigments which impart protection against corrosion, is good. The conductivity of the solution remains substantially constant, even after standing at temperatures of up to 90° C. In electrophoretic deposition processes the conductivity remains substantially constant even though the solution is continuously recycled and fresh solutions are to be added.

The compositions according to the invention have particularly good pigment moistenability and, after stoving the films formed possess excellent resistance to corrosion.

In order that the invention may be well understood the following examples are given by way of illustration only.

EXAMPLE 1

300 g. of a styrene maleic anhydride telomer (molecular weight 800, saponification number 442), containing 10% by weight cumene as the telogen, and 190 g. of unsaturated, long-chained alcohols (iodine number about 130) obtained by the reduction of linoleic acid are esterified at 170° C. until an acid number of 150 is reached. 30 g. of trimethylolpropane are added and the mixture is maintained at 180–200° C. until the acid number falls to 90–100 and the viscosity (as measured in a 1:1 solution in ethylene glycol monobutylether at 20° C.) is 140–180 cp. A solution of the resin is prepared by dissolving 400 g. of resin, 44 g. of ethylene glycol monobutylether, 51 g. of N,N-dimethylethanolamine and 510 g. of distilled water at 80° C. A clear solution of low viscosity is obtained which can, if desired, be further diluted with water. An electrophoretic coating solution is prepared by pigmenting 222 g. of this resin solution with 50 g. of red iron oxide and diluting to a solids content of 15% by weight. Good quality films may be deposited on, for example, iron sheet using a deposition voltage of up to 150 v. With regard to the salt spray test (ASTM B–11761), the Kesternich test (DIN 50,018) and resistance to alkali, the coatings are superior to those produced using known phenol resins. An important advantage of this resin is the good stability of the electrophoretic coating solutions at bath temperatures of up to 80° C. and no significant deterioration is observed after 300 hours at 60° C. or after 100 hours at 80° C. If the temperature during the esterification with trimethylol propane is raised to 230–270° C., the acid number of the resin falls to about 50, whilst the viscosity remains constant. The resistance to alkali of stored films thereby obtained and the throwing power and adhesion in electrophoretic deposition are clearly improved.

EXAMPLE 2

2000 g. of a styrene-maleic anhydride telomer (styrene: maleic anhydride 1:1 with 10% by weight cumene as the telogen) having a molecular weight of about 500, an acid number of 230 (measured by the anilide method—solution prepared in acetone and aniline added), a melt viscosity of 175° C., and a viscosity of about 1300 cp. at 20° C., are esterified in an atmosphere of carbon dioxide with 1450 g. of linoleyl alcohol having an iodine number of 130–175 until the acid number falls to 130–150. 150 g. of trimethylolpropane are then added, followed by further esterification at 210–230° C. until an acid number of about 60 is reached and the viscosity (as measured in a 1:1 solution in ethylene glycol monobutylether at 20° C.) is 150–200 cp.

An electrophoretic coating solution is prepared by mixing 100 g. of this resin with 17 g. of ethylene glycol monobutylether, neutralising 80% of the resin with 8 g. of N,N-dimethylethanolamine, diluting this solution to a solids content of 45% with water, pigmenting with about 50 g. of red iron oxide and then diluting to a solids content of about 10% with deionised water. Electrophoretic deposition is performed using two sheet steel electrodes 2 cm. apart and with a current density of 2 ma./cm.$^2$. The film does not tear up to a voltage of 300 v. The electrophoretic coating solutions according to the invention have the following advantages as compared with previously used phenolic or maleic resins or resins based on maleinised oils or acrylic polymers: the conductivity is low ($1 \times 10^{-3}$ Siemens) as it is desired and remains constant throughout the operation of the bath in recycling the solution and even after adding fresh solution to the bath when the first filling of the bath has been consumed so that the baths have good stability. They can be used at temperatures of up to 60° C. Requirements for keeping the bath cool are thus considerably reduced. The throwing power and adhesion are very good. When subjected to a salt spray test (ASTM B-11761) the deposited film shows good resistance and it is not necessary to employ corrosion-resistant pigments. The resistance to alkali of the coatings after being stoved for 20 minutes at 170° C. is 6 to 8 hours; whereas phenolic and maleic resins would be destroyed after 15–20 minutes in a 5% caustic soda solution.

If, in this example, trimethylolpropane is omitted a product having an acid number of 60 and a viscosity of only 100–130 cp. is obtained. The resistance to alkali is only 1 hour, whilst the films have an irregular surface and poor throwing power and adhesion.

EXAMPLE 3

Proceeding in a manner analogous to that described in Example 1 but using a doubly unsaturated monohydric alcohol having 16 C-atoms and an iodine number of about 150 in place of the alcohol coatings having good properties may be produced.

EXAMPLE 4

Proceeding in a manner analogous to that described in Example 1 but using a multiple unsaturated alcohol having 22 C-atoms and an iodine number of about 160 in place of the alcohol coatings having good properties may be produced.

EXAMPLE 5

300 g. of a styrene-maleic anhydride telomer (molecular weight 800, saponification number 442), containing 10% by weight cumene as telogen, and 240 g. of the monoamide formed by reacting soya oil fatty acid with ethanolamine are esterified at 180° C. to an acid number of about 100. 30 g. of trimethylolpropane are then added and the mixture is held at 200–230° C. until the acid number falls to 40–70 and the viscosity (as measured in a 1:1 solution in ethylene glycol monobutylether at 20° C.) is 150–250 cp. A solution of the resin is prepared by dissolving 400 g. of resin, 40 g. of ethylene glycol monobutylether, 25 g. of N,N-dimethylethanolamine and 430 g. of water at 80° C. A clear solution is obtained which can, if desired, be further diluted with water. To prepare a pigmented composition for electrophoretic deposition one may proceed in a manner analogous to that described in Example 1 and obtain films possessing the same good characteristics as the products obtained according to Example 1.

EXAMPLE 6

Proceeding in a manner analogous to that described in Example 5 but using the product obtained by concentrating 320 g. of linoleic acid with 62 g. of ethanolamine at a temperature of up to 210° C. in place of the monoamide of soya oil fatty acid and ethanolamine films possessing the same good characteristics may be produced.

EXAMPLE 7

Proceeding in a manner analogous to that described in Example 5 but using the same quantity of an oxazoline derivative obtained by reaction of 320 g. of fish oil fatty acid with 85 g. of N,N-dimethylpropanolamine at a temperature of up to 210° C. in place of the monoamide of soya oil fatty acid and ethanolamine films possessing the same good characteristics may be obtained.

EXAMPLE 8

Proceeding in a manner analogous to that described in Example 5 but replacing 120 g. of the monoamide of soya oil acid and ethanolamine by 120 g. of linoleyl alcohol films possessing the same good characteristics may be obtained.

In all of the eight examples the telomers used can be replaced by corresponding ones in which the telogen cumene is replaced by cymene or a xylene or an isomer mixture of the various xylenes and films may be obtained possessing the same characteristics as those produced in Examples 1–8. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A composition suitable for use as a binder in an electrophoretic coating process comprising an ammonium or amine salt of a partial esterification product of
   (I) a telogen-containing low-molecular weight polymer of
      (A) at least one compound containing a polymerizable olefinic bond and 2–12 carbon atoms and being free from hydroxy groups and selected from the group consisting of
         (A1) a monoolefin having 2–9 carbon atoms,
         (A2) a mononuclear vinyl monomer, and
         (A3) an acrylic or methacrylic acid ester, amide or nitrile
      (B) at least one olefinically unsaturated carboxylic acid or its anhydride or partial ester containing 2–10 carbon atoms, with a combination of
   (II) at least one of the components
      (a)(1) an olefinically unsaturated long - chain monohydric alcohol containing 12–24 carbon atoms and
      (a)(2) at least one unsaturated fatty acid derivative selected from the group consisting of hydroxyalkylesters of unsaturated fatty acids, alkanolamides of unsaturated fatty acids, and oxazolines of unsaturated fatty acids in every one of which the fatty acid radical has 12–30 carbon atoms, and
   (III)(b) an at least trihydric alcohol having 3–10 carbon atoms, and wherein the weight ratio of the copolymer component to the total amount of the present components (a)(1) and (a)(2) is from 70.30 to 30:40.

2. A composition as claimed in claim 1, wherein the polymer component has a molecular weight of from 500 to 1500 and wherein the telogen content of the copolymer is not more than 35% by weight.

3. A composition as claimed in claim 1, wherein in the partial esterification product the polymer component has from 0.08 to 1.5 carboxylic units per 100 molecular weight units.

4. A composition as claimed in claim 1, wherein the salt is formed by reaction with an amino alcohol.

5. A composition as claimed in claim 1, wherein the polymer is a styrene-maleic anhydride cumene telomer.

6. A composition as claimed in claim 1, wherein the component (a)(2) is a hydroxyalkyl ester of an olefinically unsaturated fatty acid in which ester the free hydroxy group is in a position adjacent to the ester bond.

7. A composition as claimed in claim 1, wherein the component (a)(2) is an oxazoline which is a reaction product of an olefinically unsaturated fatty acid or its ester with an amine of a mono- or polyhydric alcohol.

8. A composition as claimed in claim 7, wherein said oxazoline has the formulae

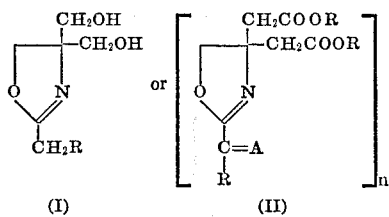

wherein R is a hydrogen atom or an alkyl group having up to 8 carbon atoms, A is 2 alkyl groups having up to 8 carbon atoms, the group $=CH_2$ or 2 hydrogen atoms and $n$ is an integer of from 1 to 30.

9. The composition of claim 1, in which the telogen incorporated into the telomer is selected from the group consisting of cumene, cymene, xylene, chloroform and diisobutyl ketone.

10. The composition of claim 1, in which said (III)(b) at least trihydric alcohol is selected from the group consisting of pentaerythritol, glycerol, trimethylolpropane and trimethylolethane.

11. A process for the preparation of a partial esterification product of a low-molecular weight polymer of (I) at least one compound containing a polymerizable olefinic bond and from 2 to 12 carbon atoms and being free from hydroxy groups and (II) at least one olefinically unsaturated carboxylic acid having 2 to 10 carbon atoms or a functional derivative thereof which comprises reacting said polymer with (III) an alkanol amide of an olefinically unsaturated fatty acid or an oxazoline of such acid or a combination thereof and (IV) with an at least trihydric alcohol having 3 to 10 carbon atoms.

References Cited
UNITED STATES PATENTS

| 3,085,986 | 4/1963 | Muskat | 260—23 |
| 3,367,895 | 2/1968 | Clark | 260—22 |
| 3,455,801 | 7/1969 | D'Alelio | 204—159.19 |
| 3,520,852 | 7/1970 | Pratt et al. | 260—23 |
| 3,528,939 | 9/1970 | Pratt et al. | 260—23 |

DONALD E. CZAJA, Primary Examiner

R. W. GRIFFIN, Assistant Examiner

U.S. Cl. X.R.

117—132 B, 161 K, 161 UZ, 161 UT; 204—181; 260—23 S, 29.2 UA, 29.2 E, 32.4, 32.6 R, 33.4 R